United States Patent [19]
Naiki et al.

[11] Patent Number: 4,959,664
[45] Date of Patent: Sep. 25, 1990

[54] LASER SCANNER WITH BEAM TRANSMISSIVITY CONTROL

[75] Inventors: Toshio Naiki; Muneo Kuroda, both of Osaka, Japan

[73] Assignee: Minolta Camera Kabushiki Kaisha, Osaka, Japan

[21] Appl. No.: 237,294

[22] Filed: Aug. 26, 1988

[30] Foreign Application Priority Data

Aug. 27, 1987 [JP] Japan .................. 62-213739

[51] Int. Cl.$^5$ .................. G01D 15/14; A04N 1/40
[52] U.S. Cl. .................. 346/108; 346/160; 358/481
[58] Field of Search .................. 346/108, 107 R, 76 L, 346/160; 358/283

[56] References Cited

U.S. PATENT DOCUMENTS 4,251,821  2/1981  Kimura .
4,410,237 10/1983  Veldkamp .................. 350/320
4,651,170  3/1987  Chandler .................. 346/108

FOREIGN PATENT DOCUMENTS 144503  9/1982  Japan .
235826 10/1986  Japan .

Primary Examiner—Mark J. Reinhart
Attorney, Agent, or Firm—Price, Gess & Ubell

[57] ABSTRACT

A light amount correcting interference membrane having almost constant thickness and characteristic for increasing transmissivity corresponding to an increase of incidence angle of a laser beam is provided on a scanning light path extending from a rotary optical deflector to a recording medium in a scanning optical system. The laser beam deflected by the rotary optical deflector for scanning the recording medium is transmitted through the light amount correcting interference membrane wherein the scanning velocity of the laser beam reaching the peripheral portion of the recording medium is faster than that of the laser beam reaching the central portion, and an incidence angle becomes large and transmissivity becomes high.

19 Claims, 3 Drawing Sheets

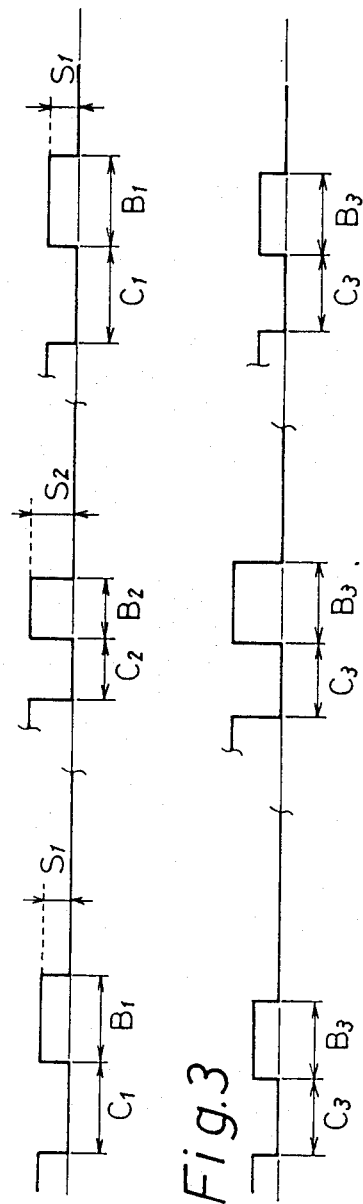

LASER SCANNER WITH BEAM TRANSMISSIVITY CONTROL

BACKGROUND OF THE INVENTION

1. Technical Field of the Invention

The present invention relates to a scanning optical system of laser beam printer and more particularly to a scanning optical system which is arranged for irradiating a laser beam to such rotary optical deflectors as a rotating polygon mirror and a Galvano mirror which rotates or sways centering on an axis and repeatedly and successively deflecting the beam within a constant angle thereby scanning the surface of a recording medium for forming an image thereon.

2. Brief Description of the Prior Art

In a scanning optical system of a laser beam printer which adopts such methods for image formation as described above, a laser beam which is deflected by a rotary optical deflector waves centering on almost a constant position of a point of deflection. As a result, the velocity of laser beam for scanning the surface of a recording medium straight to the scanning direction becomes faster at both end portions of the recording media and slower in the central portion.

U.S. Pat. No. 4,251,821 discloses a laser beam printer which makes the diameter of a dot to be used as an element of recording picture to be constant without having any influence by the variation of velocity in the scanning direction. The device is arranged to emit light for a longer time per dot when the scanning point of a laser beam approaches the periphery of a recording medium. Accordingly, the size of the dot becomes uniform in the scanning direction. However, the light amount to be given by the laser beam to the periphery of the recording medium and to the central portion can not be equal due to the difference in scanning velocity. In other words, the light amount which is received at the periphery of a recording medium wherein the scanning velocity is faster is reduced per unit area, and at the central portion where the scanning velocity is conversely slower is increased. Accordingly, the exposure state on the recording medium in the scanning direction is changed on the same image density and is caused to lower the quality of image to be formed.

SUMMARY OF THE INVENTION

The main object of the present invention is to provide a scanning optical system of a laser beam printer capable of eliminating the difference of light amount a recording medium receives on its both end portions and at the central portion arising from the difference in scanning velocity by means of a simple optical correction.

Another object of the present invention is to provide a scanning optical system capable of eliminating any uneven amount of light a recording medium receives due to an uneven scanning velocity by only providing a simple optical member. A conception of the invention occurred from the fact that when a recording medium is scanned by a laser beam deflected by a rotary optical deflector, an incidence angle of the laser beam becomes larger at a peripheral portion of the recording medium wherein the scanning velocity is slower than at the central portion wherein the scanning velocity is faster. Thus, it is arranged for disposing a light amount correcting interference membrane which has a characteristic of increasing transmissivity corresponding to an increase of an incidence angle of the laser beam on a scanning light path extending from a rotary optical deflector to a recording medium so that the light amount of the laser beam transmitted to the central portion of the recording medium is fewer lessen while the light amount of the laser beam transmitted to the periphery of the recording medium is increased. When the laser beam which is deflected by the rotary optical deflector reaches the surface of the recording medium through a light amount correcting interference membrane, an incidence angle on the light amount correcting interference membrane is changed as it occurs on the surface of the recording medium.

Further objects and features of the present invention will become more apparent from the following description in conjunction with the accompanying drawings.

BRIEF DESCRIPTION OF THE DRAWINGS

FIG. 2 is a diagram showing a light receiving state under a non-uniform scanning state in a prior art.

FIG. 3 is a diagram showing a light receiving state when uniform velocity is electrically applied to an embodiment in FIG. 1.

DETAILED DESCRIPTION OF THE INVENTION

Embodiments of the present invention will be described with reference to the drawings.

Figure 1:
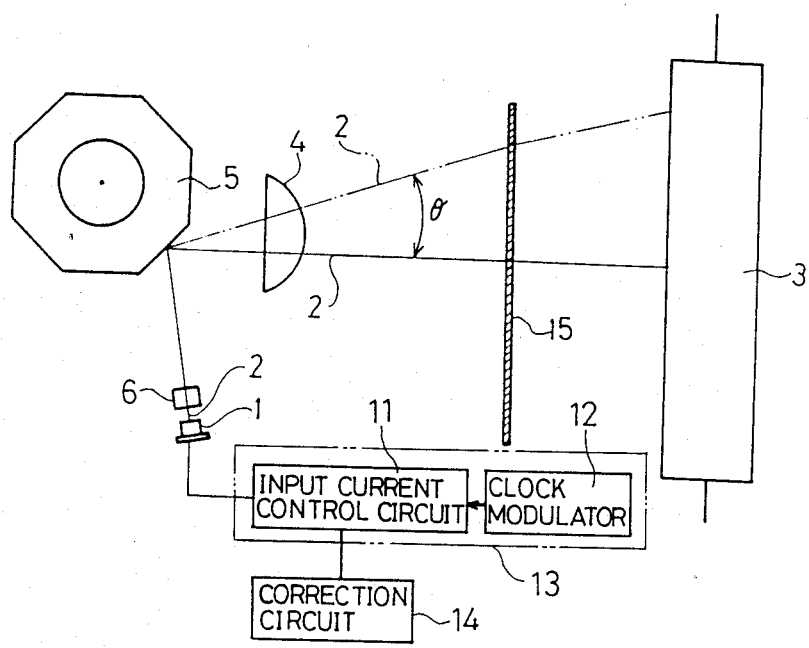
FIG. 1 is a plan view showing an outline of structure of a laser beam printer to which the present invention is applied.

FIG. 1 shows a scanning optical system of a laser beam printer in an embodiment of the present invention.

The laser beam 2 outputted, from semiconductor laser 1 is first paralleled by a collimator 6. Thereafter, main scanning is made by rotating a polygon mirror for deflecting the beam 2 through a condenser lens 4 onto a photoconductive drum 3 which is being subscanned thereby forming an electrostatic latent image.

The semiconductor laser 1 is connected to an input current control circuit 11 for controlling its driving current. The input current control circuit 11 is connected with a clock-modulator which gives a clock signal for pulse driving the semiconductor laser 1 whereby forming a semiconductor laser driving circuit 13. In the semiconductor laser driving circuit 13, a correction circuit 14 is connected to the input current control circuit 11 and is arranged to control the size of a dot exposed in the main scanning direction by the laser beam to be constant.

Now, if an image density is assumed to be in two values, black and white, and when the modulator clock signal which is given to the input current control circuit by the clock modulator 12 is turned on, the input current control circuit 11 passes a predetermined driving current to the semiconductor laser 1 and forms a dot image by emitting light for a predetermined time period with a predetermined strength. However, the scanning optical system is not provided with uniform velocity in the main scanning.

Accordingly, the velocity of the main scanning is slower at the central portion of the photoconductive drum 3 and becomes faster at the peripheral portion. Because of this reason, without the control of the correction circuit, an exposure length becomes longer as $B_1$ wherein a scanning velocity is faster while an exposure length becomes shorter as $B_2$ wherein a scanning velocity is slower and they can not be constant as shown in FIG. 2 although the laser beam 2 is output at a predetermined time period. The space between the points of exposure also becomes longer as $C_1$ wherein the scanning velocity is faster while it becomes shorter as $C_2$ wherein the scanning velocity is slower. Accordingly, there forms an image of different width and space of dots at the central portion and at the periphery of the photoconductive drum 3. The correction circuit 14 is, therefore, arranged to control the input current control circuit 11 so as to make the pulse width of the modulator clock signal which is given by the clock modulator 12 and pulse space short when scanning on the peripheral portion of the photoconductive drum 3 is made, while making them longer when scanning is made on the central portion. Accordingly, the exposure length on each exposure point becomes equal to $C_3$ and the space of exposure points also equal to $C_3$ as shown in FIG. 3 as the driving time of the semiconductor laser 1 becomes shorter when scanning is made on the peripheral portion of the photoconductive drum 3 while the driving time becomes longer when scanning is made on the central portion of the drum with a geometrical function that the scanning velocity is not constant.

By this electrical arrangement, scanning is performed with equivalent dot width and dot space to the case wherein the main scanning is made by laser beam 2 onto the photoconductive drum 3. However, there remains a problem that an exposure amount per unit area is still not constant. In other words, the light amount per unit area the laser beam 2 gives to the photoconductive drum 3 is as low as $S_1$ wherein the scanning velocity is faster while it becomes higher as $S_2$ wherein the scanning velocity is slow as the light emitting strength of the laser beam is constant. It is, therefore, arranged to provide a light amount correcting interference membrane between the polygon mirror 5 and the photoconductive drum 3 as shown in FIG. 1 so that the exposure amount per unit area becomes also constant.

Figure 4:
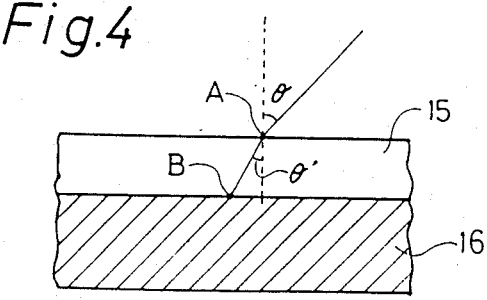
FIG. 4 is a sectional view showing a light amount correcting interference membrane in an embodiment in FIG. 1.

The light amount correcting interference membrane 15 is formed by such vaporization method on a transparent glass base plate 16 as illustrated in FIG. 4, and if the refractive index of the glass base plate 16 is designated as ng and the refractive index of the light amount correcting interference membrane 15 as n, the relation between the two is arranged to become ng<h.

The laser beam 2 is arranged to enter from the side of the light amount correcting interference membrane 15 as illustrated in FIG. 4, and the reflectivity $r_1$ at the point of incidence A into the light amount correcting interference membrane 15 and the reflectivity $r_2$ at the point of incidence B into the glass base plate 16 are expressed;

$$r_1 = \frac{1-n}{1+n} \quad r_2 = \frac{n-ng}{n+ng} \tag{1}$$

and the phase difference $\epsilon$ becomes;

$$\epsilon = \frac{2}{\lambda} 2nd \cos\theta \tag{2}$$

Here, the relations between an incidence angle $\theta$ and the reflected angle $\theta'$ is expressed;

$$\sin\theta = n \sin\theta' \tag{3}$$

and refracted angle $\theta'$ becomes;

$$\theta' = \sin^{-1}\frac{\sin\theta}{n} \tag{3}'$$

From the above, when the light amount correcting interference membrane 15 and the glass base plate 16 are totalled, the total value of reflectivity r is expressed;

$$r = r_1^2 + r_2^2 + 2 r_1 r_2 \cos\epsilon \tag{4}$$

If ng 1.5 (glass) and n 2.4 (zinc sulphide) are selected and an incidence angle $\theta$ into the light amount correcting interference membrane 15 is varied within a range of $0° \leq \theta \leq 30°$, and the main scanning phase difference of the laser beam 2 on the photoconductive drum 3 is expressed as $y = f \tan\omega t$, the main scanning velocity v on the drum 3 becomes;

$$v = \frac{dy}{dt} + \frac{\omega f}{\cos^2(\omega t)} \tag{5}$$

Accordingly, if the main scanning velocity is expressed as $v = v_o$ at the time of $\omega t = 0°$, the velocity of main scanning at the time of $\omega t = 30°$ is $v = 4/3 \, v_o$.

Figure 5:
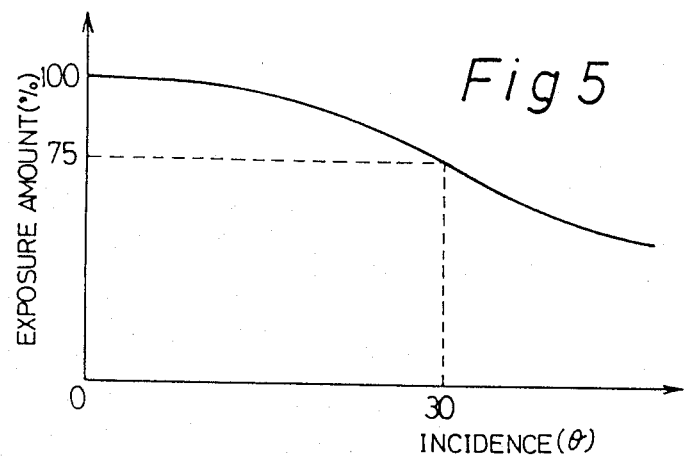
FIG. 5 is a diagram showing a relation between an incidence angle of a recording medium and the light amount received without having a light amount correcting interference membrane.

As the exposure amount per minute unit time is proportional to a reciprocal of the main scanning velocity, the exposure amount in the portion of $\omega t = 30°$ at the time of $\omega = t = 0°$ becomes a value of 25% less. The relation between incidence angle and exposure amount is graphed in FIG. 5. The position of incidence angle 0° in the graph corresponds to the main scanning central position of the photoconductive drum 3, and the position of the incidence angle 30° corresponds to main scanning peripheral portion of the drum 3. Accordingly, it is preferable to utilize a light amount correcting interference membrane which can provide about 25% higher transmissivity at the main scanning peripheral portion than the main scanning central position.

Each reflectivity $r_1$ and $r_2$ for the light amount correcting interference membrane 15 and the glass base plate 16 is obtained from the equation (1) as;

$$r_1 = -0.412 \quad r_2 = 0.231$$

Thus, the total reflectivity r at the time of $\cos\epsilon = 1$ becomes minimum in the equation (4). In other words, the transmissivity becomes maximum.

When incidence angle $\theta = 30°$, the angle of refraction $\theta'$ within the light amount correcting interference membrane 15 is obtained as about 12° from the equation (3). When angle of refraction $\theta'$ changed by 12° and the value d is selected to have a phase difference $\epsilon$ changed to about ⅔π (equivalent to the change of 25% in transmissivity), it comes to;
cos 0°−cos 12°=0.0219.

Figure 6:
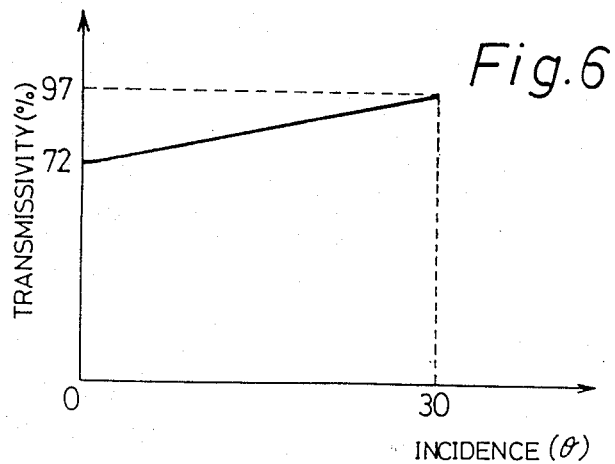
FIG. 6 is a diagram showing a relation between an incidence angle of light amount correcting interference membrane and transmissivity.

Hence, the change of ε, Δε, is;

$$\Delta\epsilon = \frac{2}{3}\pi = \frac{2\pi}{\lambda} 2nd \times 0.0219$$

and finally comes to d=3.17. Accordingly, if the thickness of the light amount correcting interference membrane is set at about 3λ, 25% increase in light amount can be obtained at an incidence angle of 30° as shown by graph in FIG. 6. The case of y=f tan (ωt) is described here as an example, however, correction can generally be made as well when y is expressed as a function of the angle of deflection t.

Figure 7:
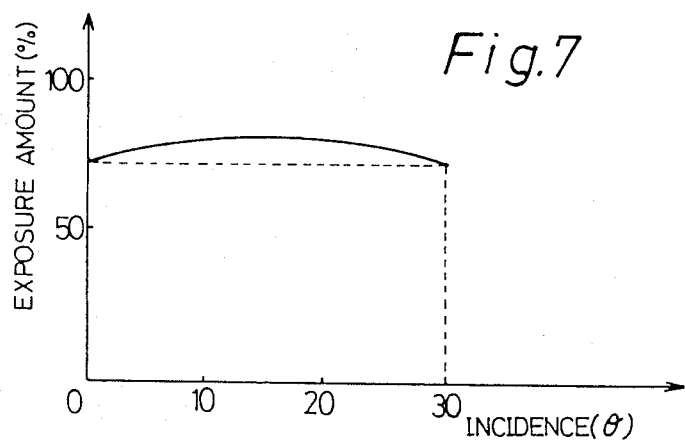
FIG. 7 is a diagram showing a relation between an incidence angle of a light amount correcting interference membrane and the light receiving amount of a recording medium.

When the light amount correcting interference membrane 15 which has such a characteristic as described above is utilized, almost constant light amount can be obtained against an incidence angle θ within the range of the total main scanning as shown by graph in FIG. 7. The amount of light irradiated to the photoconductive drum 3 lowers a little, however, a good quality image can be formed as the amount of light irradiated within all the membrane 15 is 25% and an incidence angle θ=30°. However, such conditions should be changed according to the light correcting amount and kinds of optical deflector such as polygon mirror 5 to be used. A light amount correcting interference membrane 15 made of a single layer is introduced, however, two or more layers may be applied.

Further, uneven exposure amount between the central portion and the peripheral portion in the main scanning is corrected in the embodiment, however, it may also be utilized when there occurred an uneven exposure amount by an optical aberration caused by defocus, etc. when the image is curved.

What is claimed is:

1. A scanning optical system for use in a laser beam printer, comprising:
    a laser beam generating means;
    a rotary deflection means for deflecting the laser beam emitted from the laser beam generating means to a recording medium so as to cause the laser beam to scan the recording medium according to rotation thereof; and
    an optical member provided on a scanning light path extending from the rotary deflection means to the recording medium and having an interference membrane almost in a constant thickness with a characteristic of increasing transmissivity corresponding to an increase of incidence angle of a laser beam.

2. A scanning optical system as defined in claim 1 wherein the optical member includes a light transmissible base plate on which the interference membrane is provided.

3. A scanning optical system as defined in claim 2 wherein the laser beam enters the optical member from the side of the interference membrane.

4. A scanning optical system as defined in claim 3 wherein a refractive index of the interference membrane is larger than that of the base plate.

5. A scanning optical system as defined in claim 1 wherein the rotary deflection means is a polygon mirror.

6. A scanning optical system as defined in claim 1 further comprising:
    a modulation frequency correcting means for correcting modulation frequency of the laser beam to become higher corresponding to an increase of scanning velocity to alter outputting time of the laser beam and outputting interval time therebetween.

7. A scanning optical system for use in a laser printer, comprising:
    a laser beam generating means;
    a polygon mirror for deflecting the laser beam emitted from the laser beam generating means to a recording medium so as to cause the laser beam to scan the recording medium according to rotation thereof;
    an optical member provided on a scanning light path extending from a polygon mirror to a recording medium and having an interference membrane almost in a constant thickness with a characteristic of increasing transmissivity corresponding to an increase of incidence angle of a laser beam; and
    a modulation frequency correcting means for correcting modulation frequency of the laser beam to become higher corresponding to an increase of scanning velocity to alter outputting time of the laser beam and outputting interval time therebetween.

8. A scanning optical system as defined in claim 7 wherein the optical member includes a light transmissible base plate on which the interference membrane is provided.

9. A scanning optical system as defined in claim 8 wherein the laser beam enters the optical member from the side of the interference membrane.

10. A scanning optical system as defined in claim 9 wherein a refractive index of the interference membrane is larger than that of the base plate.

11. A laser beam printer, comprising:
    a laser beam generating means;
    a recording medium moving for subscanning;
    a polygon mirror disposed between the laser beam generating means and a recording medium which performs mainscanning on the surface of the recording medium by deflecting the laser beam emitted from the laser beam generating means to the recording medium;
    an optical member provided between the polygon mirror and the recording medium and having an interference membrane almost in a constant thickness with a characteristic of increasing transmissivity corresponding to an increase of incidence angle of a laser beam; and
    a modulation frequency correcting means for correcting modulation frequency of the laser beam to become higher corresponding to an increase of scanning velocity to alter outputting time of the laser beam and outputting interval time therebetween.

12. A laser beam printer as defined in claim 11 wherein the optical member includes a light transmissible base plate on which an interference membrane is provided.

13. A laser beam printer as defined in claim 12 wherein a laser beam enters the optical member from the side of the interference membrane.

14. A laser beam printer as defined in claim 13 wherein a refractive index of the interference membrane is larger than that of the base plate.

15. A scanning optical system for use in a laser beam printer, comprising:
   a laser beam generating means;
   a deflection means for deflecting the laser beam emitted from the laser beam generating means to a recording medium so as to cause the laser beam to scan across the recording medium; and
   an optical member provided on a scanning light path extending from the deflection means to the recording medium, the optical member including a light transmissible base plate and an interference filter having a substantially constant thickness with a characteristic of increasing transmissivity corresponding to an increase of incidence angle of a laser beam.

16. A scanning optical system as defined in claim 15, wherein a refractive index of the interference filter is larger than that of the base plate.

17. A scanning optical system as defined in claim 15, wherein the deflection means is a polygon mirror.

18. In a laser beam scanning system having a laser beam generator and a rotary deflector which deflects the laser beam generated from the laser beam generator to a beam receiving plane so as to cause the laser beam to scan the beam receiving plane according to rotation thereof, the improvement comprising:
   an interference filter provided between the rotary deflector and the beam receiving plane, said interference filter having a substantially constant thickness with a characteristic of increasing transmissivity corresponding to an increase of incidence angle of the laser beam in order to obtain a substantially constant light amount on the beam receiving plane despite a varying incidence angle of the laser beam during the scanning operation.

19. In an improved scanning optical system for use in a laser beam printer having a laser beam generating means for providing a laser beam that can be modulated with printing information and means for scanning the laser beam across a recording surface from a central on axis position to respective peripheral portions of the recording surface with a resulting variance in angle of the laser beam from the central on axis position, the improvement comprising;
   an optically transmissive member mounted in a scanning path of the laser beam before the recording surface and having a coating layer, an index of refraction and optical thickness of predetermined values, extending across the scanning path to lessen the angle of transmission of the incident laser beam relative to any corresponding increase in angle of incident on the coating layer to insure a relatively even transmission of the laser beam across the scan path to the recording member.

* * * * *